US010382156B2

(12) United States Patent
Trojer et al.

(10) Patent No.: US 10,382,156 B2
(45) Date of Patent: Aug. 13, 2019

(54) REDUCING INTERFERENCE USING INTERPOLATION/EXTRAPOLATION

(71) Applicant: Telefonaktiebolaget LM Ericsson (publ), Stockholm (SE)

(72) Inventors: Elmar Trojer, Täby (SE); Miguel Berg, Sollentuna (SE); Per-Erik Eriksson, Stockholm (SE); Chenguang Lu, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/765,127

(22) PCT Filed: Oct. 8, 2015

(86) PCT No.: PCT/SE2015/051073
§ 371 (c)(1),
(2) Date: Mar. 30, 2018

(87) PCT Pub. No.: WO2017/061914
PCT Pub. Date: Apr. 13, 2017

(65) Prior Publication Data
US 2018/0294909 A1 Oct. 11, 2018

(51) Int. Cl.
*H04J 11/00* (2006.01)
*H04L 25/08* (2006.01)
*H04L 27/26* (2006.01)

(52) U.S. Cl.
CPC ......... *H04J 11/0066* (2013.01); *H04J 11/004* (2013.01); *H04L 27/2607* (2013.01); *H04L 27/2647* (2013.01); *H04L 25/085* (2013.01)

(58) Field of Classification Search
CPC .......... H04J 11/003; H04J 1/12; H04J 11/004; H04J 11/0036; H04J 11/0076; H04J 11/0079; H04J 2211/005
See application file for complete search history.

(56) References Cited

U.S. PATENT DOCUMENTS

| 2008/0043888 | A1* | 2/2008 | Bhukania | H04L 25/03006 375/346 |
| 2009/0161804 | A1* | 6/2009 | Chrabieh | H04J 11/0036 375/346 |
| 2016/0049972 | A1* | 2/2016 | Moher | H04B 1/12 370/277 |

OTHER PUBLICATIONS

International Search Report and Written Opinion of the International Searching Authority, PCT/SE2015/051073, dated Jun. 9, 2016, 9 pages.

(Continued)

*Primary Examiner* — David C Payne
*Assistant Examiner* — Sarah Hassan
(74) *Attorney, Agent, or Firm* — Sage Patent Group

(57) ABSTRACT

It is provided a method for reducing interference. The method is performed in a receiver and comprises the steps of: receiving a first signal forming part of a symbol; extracting a differential signal by comparing the first signal with a second signal, wherein the first signal and the second signal are based on the same information; estimating a base frequency of the differential signal for the symbol; mapping the base frequency to a first time of the symbol; estimating frequencies at other times of the symbol using interpolation and/or extrapolation using base frequencies from at least one adjacent symbol; reconstructing an interfering signal based on the estimated frequencies; and subtracting the reconstructed interfering signal from a received signal for the symbol.

22 Claims, 4 Drawing Sheets

(56) References Cited

OTHER PUBLICATIONS

De Frein, et al, "OFDM Narrowband Interference Estimation Using Cyclic Prefix Based Algorithm," Aug. 30, 2006 (XP055276051) <URL http://ee.ucd.ie/~mark/papers/OFDM_Workshop_NBI.pdf> 5 pages.

* cited by examiner

REDUCING INTERFERENCE USING INTERPOLATION/EXTRAPOLATION

CROSS REFERENCE TO RELATED APPLICATIONS

This application is a 35 U.S.C. § 371 national stage application of PCT International Application No. PCT/SE2015/051073 filed on Oct. 8, 2015, the disclosure and content of which is incorporated by reference herein in its entirety.

TECHNICAL FIELD

The invention relates to a method, receivers, a computer program and a computer program product for reducing interference using interpolation/extrapolation.

BACKGROUND

OFDM (Orthogonal Frequency Domain Multiplex) dominates modern communication systems, like 4G/5G, WiFi, DSL (Digital Subscriber Line), UWB (Ultra Wide Band) etc., as their base modulation scheme. Apart from numerous advantages of OFDM, one problem is its proneness to the in-band narrowband RFI (Radio Frequency Interference) such as a single carrier jammer, FM (Frequency Modulation) signal, AM (Amplitude Modulation) signal, etc. This is due to the spectral leakage from FFT (Fast Fourier Transform) operation in the OFDM receiver. The leakage spreads the energy of the narrowband interfering signal over the whole bandwidth of the desired signal, which could significantly interfere all subcarriers of the OFDM system. An OFDM system can thus get easily jammed by a strong narrowband signal source. For example, it is a well-known problem that a WiFi device can get totally jammed when it gets close to a microwave oven in operation.

Even in licensed spectrum bands, a wireless system like LTE (Long Term Evolution) can still suffer from intentional jammers, when someone generates deliberately strong interfering signals to jam the system around. Also, unintentional interference can occur in licensed spectrum bands e.g. from faulty equipment, local oscillator leakage, harmonics or intermodulation products from transmitters in other bands. Furthermore, in some systems, radio base stations are provided with a central digital processing unit (e.g. for baseband processing) and remote radio heads comprising antennas. The links to the remote radio heads carry RF (Radio Frequency) signals, but can be downconverted to intermediate frequency e.g. to be able to use Ethernet cabling. However, nearby strong analogue modulated signals on the same IF band, e.g. from walkie-talkie, may get a way to be coupled into the system through the cable or the cable connector and thereby interfere the downconverted RF signals received from the cable. In practice, many Ethernet cables are unshielded or insufficiently shielded, whereby RFI signals negatively affects the reception of the intended signal.

In C. De Frein, M. F. Flanagan and A. D. Fagan, "OFDM Narrowband Interference Estimation using Cyclic Prefix Based Algorithm", 11th International OFDM Workshop, Hamburg, Germany, 30-31 Aug. 2006, http://ee.ucd.ie/~mark/papers/OFDM_Workshop_NBI.pdf, a NBI (Narrowband Interference) cancellation algorithm for a wideband OFDM receiver is presented. The NBI is modelled as a single-tone sinusoid. The information bearing component of the received signal is removed prior to the estimation of NBI. However, this solution presents great limitations in the single-tone sinusoid modelling; in reality, interference comes in a great number of waveforms.

SUMMARY

It is an object to provide a way to reduce interference in a receiver.

According to a first aspect, it is provided a method for reducing interference. The method is performed in a receiver and comprises the steps of: receiving a first signal forming part of a symbol; extracting a differential signal by comparing the first signal with a second signal, wherein the first signal and the second signal are based on the same information; estimating a base frequency of the differential signal for the symbol; mapping the base frequency to a first time of the symbol; estimating frequencies at other times of the symbol using interpolation and/or extrapolation using base frequencies from at least one adjacent symbol; reconstructing an interfering signal based on the estimated frequencies; and subtracting the reconstructed interfering signal from a received signal for the symbol. The symbol can e.g. be an OFDM symbol.

The method may further comprise the steps of: calculating an estimated phase function by integrating the estimated frequencies; calculating estimated amplitude and phase of the differential signal based on the phase function; and wherein the step of reconstructing comprises reconstructing the interfering signal based on the estimated phase function, the estimated amplitude and estimated phase.

The method may further comprise the step of: receiving the second signal, wherein the first signal and the second signal are both based on transmitting the same information from one transmitter.

One of the first signal and the second signal may carry a cyclic prefix, comprising copies of information of the other signal. Alternatively or additionally, one of the first signal and the second signal may carry a cyclic suffix, comprising copies of information of the other signal.

The second signal may be a known reference signal comprising information used by a transmitter for transmitting the first signal.

The step of estimating a base frequency may comprise the use of a least square estimate.

The method may be performed in a digital domain.

The step of estimating frequencies may use a sliding window function.

The step of estimating frequencies may use a spline function.

The first time may be in the middle of the symbol.

According to a second aspect, it is provided a receiver. The receiver comprises: a processor; and a memory storing instructions that, when executed by the processor, cause the receiver to: receive a first signal forming part of a symbol; extract a differential signal by comparing the first signal with a second signal, wherein the first signal and the second signal are based on the same information; estimate a base frequency of the differential signal for the symbol; map the base frequency to a first time of the symbol; estimate frequencies at other times of the symbol using interpolation and/or extrapolation using base frequencies from at least one adjacent symbol; reconstruct an interfering signal based on the estimated frequencies; and subtract the reconstructed interfering signal from a received signal for the symbol.

The receiver may further comprise instructions that, when executed by the processor, cause the receiver to: calculate an estimated phase function by integrating the estimated frequencies; calculate estimated amplitude and phase of the differential signal based on the phase function; and wherein the instructions to reconstruct comprise instructions that, when executed by the processor, cause the receiver to reconstruct the interfering signal based on the estimated phase function, the estimated amplitude and estimated phase.

The receiver may further comprise instructions that, when executed by the processor, cause the receiver to: receive the second signal, wherein the first signal and the second signal are both based on transmitting the same information from one transmitter.

One of the first signal and the second signal may carry a cyclic prefix (and/or suffix), may comprise copies of information of the other signal.

The second signal may be a known reference signal comprising information used by a transmitter for transmitting the first signal.

The instructions to estimate a base frequency may comprise instructions that, when executed by the processor, cause the receiver to use a least square estimate.

The receiver may be configured to perform the instructions for processing in a digital domain.

The instructions to estimate frequencies may comprise instructions that, when executed by the processor, cause the receiver to use a sliding window function.

The instructions to estimate frequencies may comprise instructions that, when executed by the processor, cause the receiver to use a spline function.

The first time may be in the middle of the symbol.

According to a third aspect, it is provided a receiver comprising: means for receiving a first signal forming part of a symbol; means for extracting a differential signal by comparing the first signal with a second signal, wherein the first signal and the second signal are based on the same information; means for estimating a base frequency of the differential signal for the symbol; means for mapping the base frequency to a first time of the symbol; means for estimating frequencies at other times of the symbol using interpolation and/or extrapolation using base frequencies from at least one adjacent symbol; means for reconstructing an interfering signal based on the estimated frequencies; and means for subtracting the reconstructed interfering signal from a received signal for the symbol.

According to a fourth aspect, it is provided a computer program for reducing interference. The computer program comprises computer program code which, when run on a receiver causes the receiver to: receive a first signal; extract a differential signal by comparing the first signal with a second signal, wherein the first signal and the second signal are based on the same information; estimate a base frequency of the differential signal for the symbol; map the base frequency to a first time of the symbol; estimate frequencies at other times of the symbol using interpolation and/or extrapolation using base frequencies from at least one adjacent symbol; reconstruct an interfering signal based on the estimated frequencies; and subtract the reconstructed interfering signal from a received signal for the symbol.

According to a fifth aspect, it is provided a computer program product comprising a computer program according to the fourth aspect and a computer readable means on which the computer program is stored. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
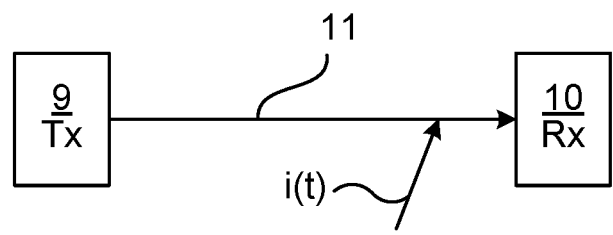
FIG. 1 is a schematic diagram illustrating an environment in which embodiments presented herein can be applied.

FIG. 1 is a schematic diagram illustrating an environment in which embodiments presented herein can be applied. A transmitter 9 here sends a signal over a communication channel 11 to a receiver 10. The communication channel 11 can be a wire based channel, such as Ethernet, optical fibre, G.fast (ITU-T G.9700, G.9701), etc. or a wireless channel, such as WiFi, LTE (Long Term Evolution), WCDMA (Wideband Code Division Multiple Access), etc. While LTE is used as an example to illustrate embodiments presented herein, the embodiments can be applied to any suitable communication standard where interference should be reduced. The receiver to can be housed in a device also comprising a transmitter.

However, an interfering signal i(t) is combined with the original signal from the transmitter 9. Hence, the receiver to will receive a signal which is a combination of the originally transmitted signal from the transmitter 9 and the interfering signal i(t). Other factors may also affect the signal received by the receiver 10, but embodiments presented herein are directed towards reducing the effects of interference.

Figure 2:
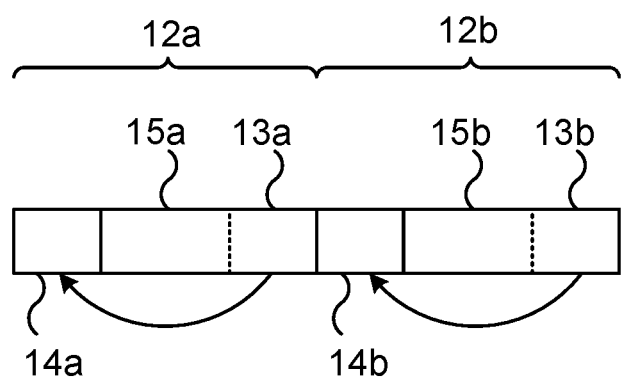
FIG. 2 is a schematic diagram illustrating the use of cyclic prefix.

FIG. 2 is a schematic diagram illustrating the use of cyclic prefix (CP). A first symbol 12a and a second symbol 12b are shown here. The symbols 12a-b can e.g. be OFDM (Orthogonal Frequency Domain Multiplexing) symbols. More symbols can follow or precede the shown symbols 12a-b.

Looking to the first symbol 12a, this comprises a first signal 3a, a second signal 14a and a third signal 5a. The second signal 14a is a copy of the first signal 3a, denoted a cyclic prefix. The purpose of the cyclic prefix is to compensate for distortions (e.g. due to multipath) of a radio channel, and retains orthogonality between OFDM subcarriers. The third signal 15a does not have any cyclic prefix copy. The first signal 13a and the third signal 15a thus together make up the information of the transmission signal, with the second signal 14a being a copy of the first signal 13a.

In the same way, the second symbol 12b comprises its own first signal 13b, second signal 14b and third signal 15b. Again, the second signal 14b is a cyclic prefix copy of the first signal 13b.

As is explained in more detail below, since the cyclic prefixes are transmitted with the same information from the transmitter, knowledge of the interfering signal can be derived by comparing the first signal and the second signal within a symbol.

The CP length is usually specified longer than the wireless channel delay spread to avoid inter-symbol-interferences (ISI). With CP, channel equalization can be implemented in much lower complexity in frequency domain, given a small capacity overhead from CP length. For example, in LTE for 15 kHz subcarrier spacing, a normal CP is 5.2 μs/4.7 μs while an extended CP is 16.7 μs. The normal CP corresponds to less than 7% overhead of the symbols. Especially for typical indoor environments, the channel spread is normally less than 1 μs. So the CP in LTE is much longer than the channel spread. When the CP is longer than the actual channel spread, the unoccupied CP provides extra redundancy which can be used for RFI cancellation.

Figure 3:
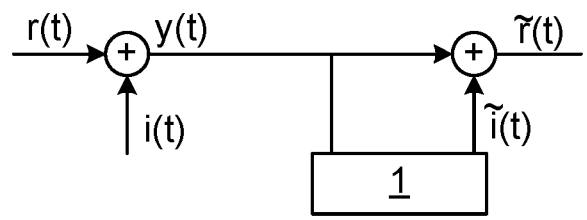
FIG. 3 is a schematic diagram illustrating interference cancellation used in the receiver to of FIG. 1.

FIG. 3 is a schematic diagram illustrating interference cancellation used in the receiver to of FIG. 1.

r(t) is here the desired received signal. An interference i(t) is added to the received signal, whereby the receiver actually receives y(t). Using an interference estimator 1, the interfering signal is estimated as î(t). By subtracting the estimated interference î(t) from y(t), a close estimate to the desired received signal r̂(t) is obtained.

The way this is achieved will now be described with reference to FIGS. 4A-B, which are flow charts illustrating methods for reducing interference performed in the receiver of FIG. 1.

In a receive first signal step 40, a first signal (14a) is received. The first signal forms part of a symbol, e.g. an OFDM symbol.

In an extract differential step 42, a differential signal is extracted by comparing the first signal with a second signal. The first signal and the second signal are based on the same information. For instance, one of the first signal and the second signal may comprise a cyclic prefix/suffix, containing copies of information of the other signal. Alternatively, the second signal is a known reference signal, which the receiver knows that was used as information for generating the first signal.

In an estimate base frequency step 44, a base frequency of the differential signal for the symbol is estimated. This estimation can e.g. be based on a least square estimate.

In a map base frequency step 46, the base frequency is mapped to a first time of the symbol. This first time can be at any time of the symbol. In one embodiment, the first time is set in the middle of the symbol.

In an interpolate/extrapolate step 48, frequencies at other times of the symbol are estimated using interpolation and/or extrapolation using base frequencies from at least one adjacent symbol. This step can e.g. make use of a sliding window function. Alternatively or additionally, the interpolation/extrapolation is performed using a spline function.

In a reconstruct interfering signal step 54, an interfering signal is reconstructed based on the estimated frequencies.

In a subtract step 56, the reconstructed interfering signal is subtracted from a received signal for the symbol.

In a conditional more symbols step 58, it is determined whether there are more symbols for which to perform interference reduction for. If this is the case, the method returns to the receive first signal step 40, but now for a new symbol. If interference reduction is not to be applied for any more symbols, the method ends.

Looking now to FIG. 4B, only new or modified steps compared to the method illustrated by the flow chart of FIG. 4A will be described.

Optionally, there is a receive second signal step 41, in which a second signal is received. The first signal and the second signal are both based on transmitting the same information from one transmitter. For instance, one of the first signal and the second signal can carry a cyclic prefix, comprising copies of information of the other signal, see e.g. FIG. 2 and corresponding description above.

In a calculate phase function step 50, an estimated phase function is calculated by integrating the estimated frequencies.

In a calculate amplitude and phase step 52, estimated amplitude and phase of the differential signal is calculated based on the phase function.

In this embodiment, the reconstruct interfering signal step 54 comprises reconstructing the interfering signal based on the estimated phase function, the estimated amplitude and estimated phase.

Figure 4A:
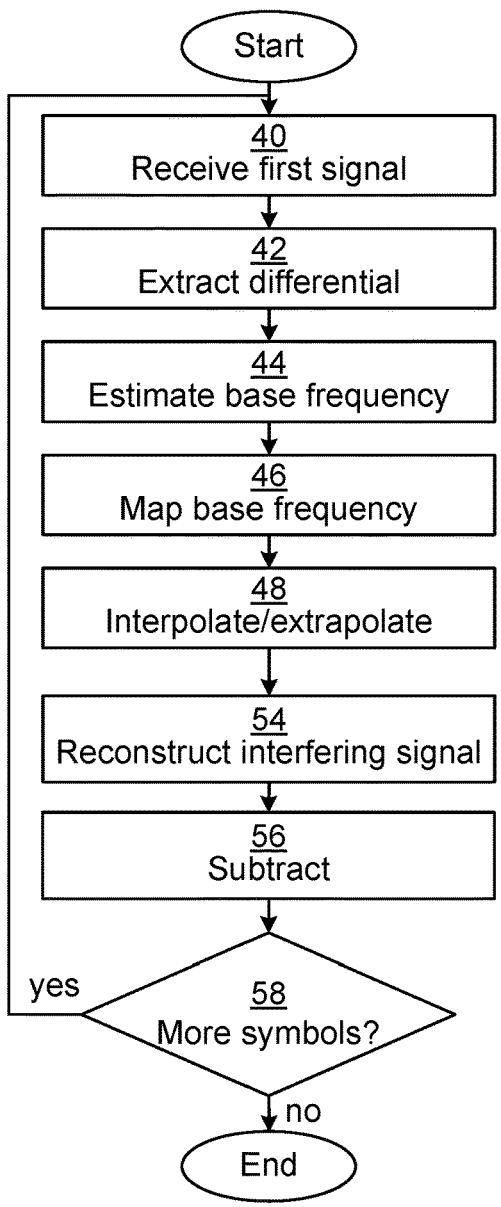
FIGS. 4A-B are flow charts illustrating methods for reducing interference performed in the receiver of FIG. 1.
Figure 4B:
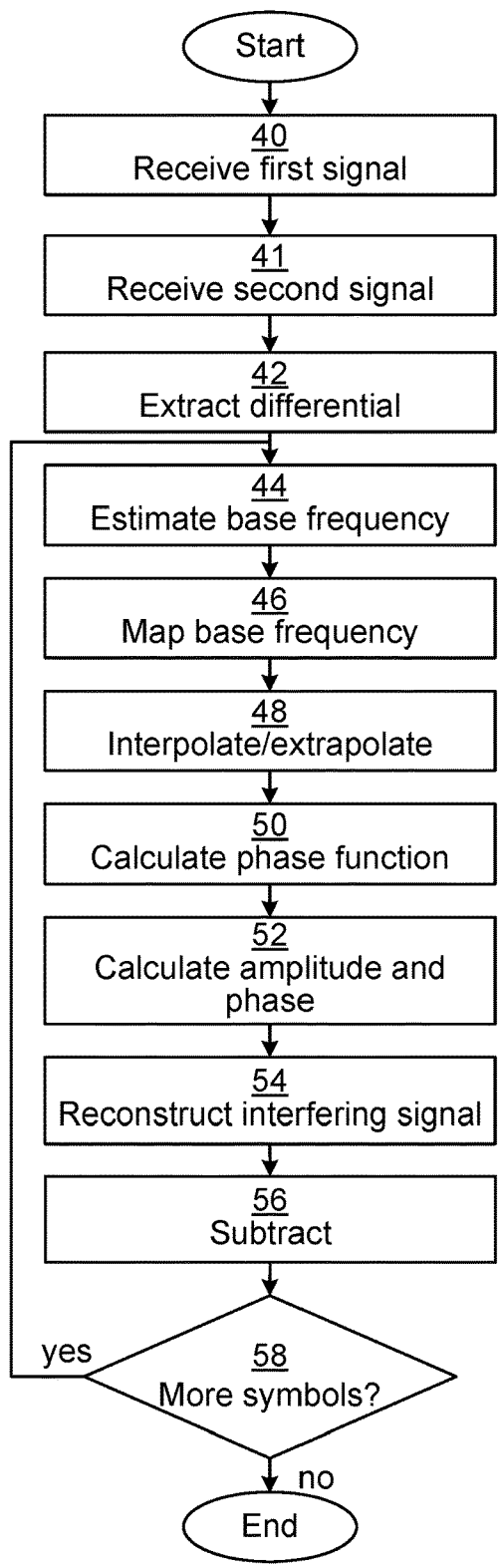

The methods of FIGS. 4A-B can be performed in the digital domain, simplifying the implementation of calculations and estimations.

Embodiments of the methods illustrated in FIGS. 4A-B will now be described in some more detail.

First, we will describe the interference signal in form of an FM signal. In FM, the baseband information-bearing signal (e.g. voice signal) m(t) modulates the frequency of a carrier wave. The information signal m(t) is applied to the control voltage of a VCO (voltage-controlled oscillator). Therefore, the instantaneous frequency ω(t) (in rad/s) of the FM signal can be expressed as $$\omega(t)=\omega_w+2\pi K_{VCO}m(t) \tag{1}$$

where $\theta_c$ is the carrier wave and $K_{VCO}$ is the voltage-to-frequency gain of the VCO expressed in units of Hz/V. Therefore the term of $2\pi K_{VCO}m(t)$ represents the frequency deviation function. Then the FM signal can be expressed as $$x_{FM}(t)=Ae^{j(\omega_c t+2\pi K_{VCO}\int m(t)dt+\varphi)} \tag{2}$$

As an example, let $m(t)=A_m \cos(\omega_m t)$, the corresponding FM signal is expressed as $$x_{FM}(t) = Ae^{j\left(\omega_c t+\frac{K_{VCO}A_m}{f_m}\sin(\omega_m t)+\varphi\right)} \tag{3}$$

$$= Ae^{j\left(\omega_c t+\frac{\Delta f}{f_m}\sin(\omega_m t)+\varphi\right)}$$

$$= Ae^{j(\omega_c t+\beta\sin(\omega_m t)+\varphi)}$$

where $\Delta f=K_{VCO}A_m$ represents the peak frequency deviation in Hz from the carrier frequency, since $$\omega(t)=\omega_c+\Delta\omega \cos(\omega_m t) \tag{4}$$

where $\Delta\omega=2\pi\Delta f$ is the frequency in rad. Also $$\beta = \frac{\Delta f}{f_m} = \frac{\Delta\omega}{\omega_m}$$

is defined as modulation index for FM, which is usually used for FM signal spectrum analysis.

By using CP or other known signal comparison as described above, a good differential signal for parameter estimation is obtained in step 42. For FM, the challenge is how to estimate the frequency variation and further reconstruct the FM signal. In embodiments presented herein, this can be achieved by estimating the frequency variation function and reconstructing the FM signal for cancellation. The following describes more details.

Rewrite an FM signal in a more general way as $$x_{FM}(t)=Ae^{j\varphi}e^{jp(t)} \quad (5)$$

where $p(t)=\omega_c t+2\pi K_{VCO}\int_0^t m(t)dt$ represents the phase variation function. To reconstruct $x_{FM}(t)$, one task is to estimate p(t), which varies over time. We further write $$p(t)=\int_0^t \omega(t)dt \quad (6)$$

where $\omega(t)=\omega_c+2\pi K_{VCO}m(t)$ represents the frequency variation function. Here, we estimate $\omega(t)$ first and then calculate p(t).

In step 44, the base frequency of $d_{CP}(t)$ is estimated. For each symbol, we can obtain the CP differential signal $d_{CP}(t)=y_{CP}(t)-y_{CPO}(t)$, or equivalent by comparing received signal with a known reference signal. We estimate the base frequency of $d_{CP}(t)$ as $\omega_d$, assuming $d_{CP}(t)= A_d e^{j\omega_d t+\varphi_d}$. Here we show a Least Square (LS) estimate of $\omega_d$. Take the phase of $d_{CP}(t)$ as $p_d(t)=\omega_d t+\varphi_d$, which is a linear function. The slope $\omega_d$ can be estimated by linear regression. Given the samples of $p_d(t)$ as $p_d(t_i)$, where $t_i=(i-1)T_s$ in which $T_s$ is the sampling period and $i\in[1, 2, \ldots, N]$ where N is the number of samples used, it the best fit/estimate of $\omega_d$ in the LS sense is calculated as $$\tilde{\omega}_d = \frac{\sum t_i p(t_i) - \frac{\sum t_i \sum p(t_i)}{N}}{\sum t_i^2 - \frac{(\sum t_i)^2}{N}} \quad (7)$$

Note that, for a better performance, the time samples which do not suffer from the ISI due to the channel before the receiver can be used. As argued before, the redundant part of CP can be used, or by comparing with a known reference signal.

The LS method gives a maximum likelihood estimate, which is more accurate than the eigen-decomposition method when the estimation SNR is high, i.e. relatively strong interference comparing to the noise.

Figure 5:
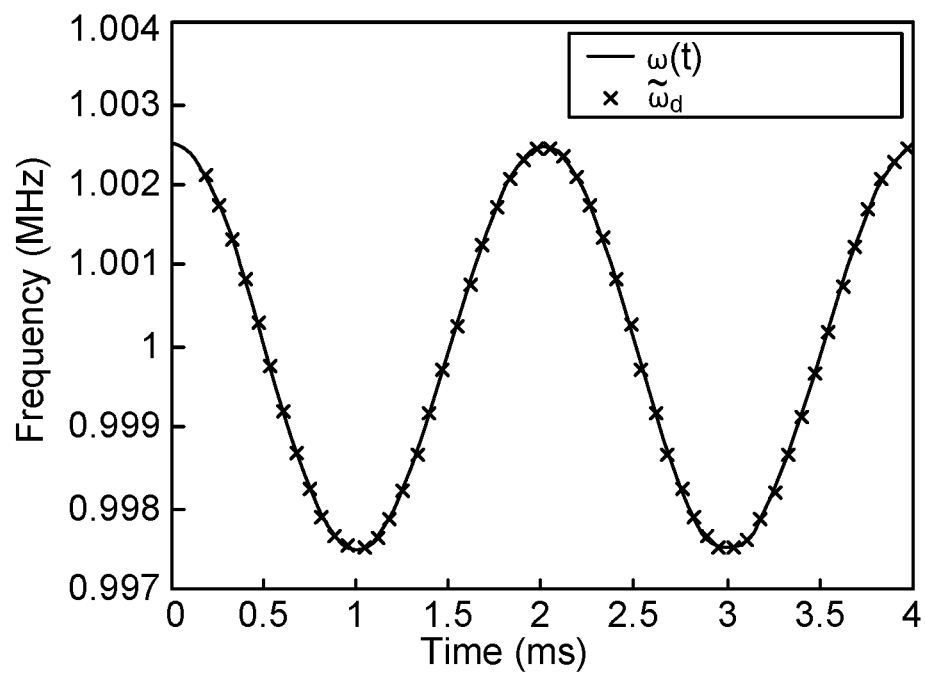
FIG. 5 is a schematic graph illustrating how interference is estimated in the methods illustrated in FIGS. 4A-B.

In step 46, the base frequency $\omega_d$ is mapped on $\omega(t)$. The base frequency $\tilde{\omega}_d$ is estimated using a part of signal (i.e. $d_{CP}(t)$) on a specific symbol. It is a reasonable hypothesis that a good estimate of $\tilde{\omega}_d$ corresponds to the actual frequency at a time instant within the symbol period. Further, $d_{CP}(t)$ includes both the frequency information carried in the beginning of the symbol, e.g. CP, and that carried in the end of the symbol. Therefore, we can make a further hypothesis that $\omega_d$ corresponds to the actual frequency at a time instant in the middle of the symbol, as the CP and the original part of the CP is symmetric around the middle of the symbol. As shown in FIG. 5 and explained below, the estimated $\tilde{\omega}_d$ at the half-symbol time instant of each symbol matches very well with the original FM signal frequency variation function $\omega(t)$. It looks like that $\tilde{\omega}_d$ is the sample of $\omega(t)$ at each half-symbol time instant. It shows the hypothesis is valid, when the estimation is accurate for a strong FM signal, especially when it carries low frequency information signal (500 Hz in this example). It is sufficiently accurate for voice signal, in which most of energy is below 1 kHz.

In step 48, $\omega(t)$ is estimated by interpolation and/or extrapolation from $\omega_d$.

Significantly, in FIG. 5 it is shown that the estimated $\tilde{\omega}_d$ is able to catch the overall shape of $\omega(t)$, since $\omega(t)$ varies slowly comparing to the symbol time. With this finding, the frequency variation function $\omega(t)$ on any symbol can be further estimated by interpolation and/or extrapolation with known $\tilde{\omega}_d$ of multiple symbols around.

As one example, a sliding-window based implementation can be used for interpolation and/or extrapolation which will now be described. Let the current symbol for estimation be symbol o, define a sliding window of K continuous symbols with the symbol index $k\in[-K+1, -K+2, \ldots, 0]$. For example, when K=3, $k\in[-2, -1, 0]$. The sliding window takes into consideration the current symbol and the K−1 previous symbols. The sliding window updates every time when the current symbol moves on to next symbol.

Further, define $\tilde{\omega}_d(k)$ as the estimated base frequency for symbol k in the sliding window. When the current symbol arrives, $\tilde{\omega}_d(k)$ of the previous K−1 symbols are already estimated and available. If the receiver has no such buffer, it can rely on extrapolation to extrapolate $\omega(t)$ of the current symbol from known $\tilde{\omega}_d(k)$ of the previous K−1 symbols. For example, let the start time of current symbol $t_0$=0. Assume the half symbol time mapping, the time instant corresponds to $\tilde{\omega}_d(k)$ can be expressed as:

$$t_d(k) = (2k+1)\frac{T_{sym}}{2} \quad (8)$$

where $T_{sym}$ is the symbol period. With the pairs of $t_d(k)$ and $\tilde{\omega}_d(k)$ for the previous K−1 symbols, we know $\omega(t_d(k))=\tilde{\omega}_d(k)$. Then $\omega(t)$ of the current symbol at any time instant $t\in[0, T_{sym}]$ can be extrapolated as $\tilde{\omega}(t)$, for example with the spline interpolation based techniques.

If the receiver can buffer one symbol, the base frequency estimate of the current symbol $\tilde{\omega}_d(0)$ can be estimated first and then be used together with $\tilde{\omega}_d(k)$ of the previous symbols. In this case, $\omega(t)$ of the current symbol is interpolated for the first half symbol period, while it is extrapolated for the second half symbol period.

If the receiver can buffer two or more symbols, it is possible to take next symbols into the sliding window. In this case, $\omega(t)$ of the current symbol can be interpolated. Interpolation usually works better than extrapolation. In this case, it needs to buffer next symbol(s) to use interpolation.

In step 50, the phase function p(t) is calculated by integrating $\omega(t)$. The phase variation function of the FM signal p(t) of the current symbol can be estimated by $\tilde{p}(t)=\int_0^t \tilde{\omega}(t)dt$ for $t\in[0, T_{sym}]$. For digital processing, using numerical integration technique calculates $\tilde{p}(n)$ given the corresponding $\tilde{\omega}(n)$ for the n:th sample.

In step 52, the amplitude and initial phase are calculated. With an FM interfering signal, the differential signal can be expressed as $$d_{CP}(t)=Ae^{j\varphi}(e^{jp(t)}-e^{jp(t+T_0)}) \quad (9)$$

Once p(t) is known, one can express $Ae^{j\varphi}$ as $$Ae^{j\varphi} = \frac{d_{CP}(t)}{e^{j\tilde{p}(t)} - e^{j\tilde{p}(t+T_0)}} \quad (10)$$

In digital processing, with the estimate $\tilde{p}(n)$ from the last step, $Ae^{j\varphi}$ can be estimated by averaging the samples available as $$\tilde{A}e^{j\tilde{\varphi}} = \sum_n \frac{d_{CP}(n)}{e^{j\tilde{p}(n)} - e^{j\tilde{p}(n+N_f)}}/N_s \quad (11)$$

where n is the sample index, $N_f$ is the number of samples in the FFT interval and $N_s$ is the number of samples used for the estimation.

In step 54, the interfering signal is reconstructed. The FM signal can now be reconstructed over the current symbol period as:

$$\tilde{x}_{FM}(t) = \tilde{A}e^{j\tilde{\varphi}}e^{j\tilde{p}(t)} \quad (12)$$

In step 56, the interfering signal is subtracted, whereby the received signal after cancellation can be expressed as:

$$\tilde{r}(t) = y(t) - \tilde{A}e^{j\tilde{\varphi}}e^{j\tilde{p}(t)} \quad (13)$$

In digital processing, the received signal after cancellation can be expressed as $$\tilde{r}(n) = y(n) - \tilde{A}e^{j\tilde{\varphi}}e^{j\tilde{p}(n)} \quad (14)$$

Performance of embodiments of the method has been evaluated by simulations. Two kinds of channels have been investigated. One channel is AWGN (Additive White Gaussian Noise) channel, while the other is Cat cable channel for remote radio heads. An LTE 20 MHz profile is used, where the CP length is set to 144 samples or 4.7 μs. The FM signal has the peak frequency deviation Δf=2.5 kHz. The information signal m(t) is modelled as a cosine wave at 500 Hz or 1 kHz, as voice energy concentrates below 1 kHz. SINR (Signal to Interference and Noise Ratio) in dB, averaged over 200 OFDM symbols are calculated for performance comparison. In this example, spline interpolation is used and the sliding window length sets to three, which takes one previous symbol, the current symbol and one next symbol. When we set the interference level in the simulation, it takes the reference of the received desired signal power spectral density (PSD) level at the RFI carrier frequency. Here, PSD is defined as the dB value of the ratio between power per FFT bin (mW) and FFT bin width (Hz). For example, when we set SIR=−50 dB, it means that the interference is 50 dB stronger than the received desired signal at the RFI carrier frequency, not over the whole data bandwidth.

First, the AWGN channel will be evaluated. The RFI mitigation method is applied in time domain before the block of removing CP in the receiver. The system is modelled in complex baseband. In this case, full CP length is used for RFI estimation, as there is no delay spread channel such as air and cable etc., between transmitter and receiver. So the FEQ (Frequency-domain Equaliser) is just a placeholder in this case, as it is not needed for the AWGN channel.

A simulation has been performed with a strong FM interference/jammer 50 dB stronger than the signal at the FM carrier. It is shown that without any mitigation, as expected, the SINR is extremely degraded by about 100 dB at 1 MHz, the FM carrier frequency. Also, due to the spectrum leakage, at other frequencies there is more than 300 dB degradation in SINR. At the FM carrier frequency, the method described above outperforms the prior art method mentioned in the background section by 15 dB. With the prior art method, the SINR around 1 MHz is lower than −10 dB, which is much lower than the LTE receive sensitivity, while, with the method described above, the SINR is about 5 dB which is much higher than the LTE receive sensitivity. This implies that LTE signal can survive the FM interference with the embodiments presented herein in this case. The leakage spread of the embodiments presented herein is also narrower, though the SINR is similar at other frequencies, which is only to dB lower than the case without RFI.

Other simulations have shown that the embodiments presented herein is better than the prior art method when interference is high compared to noise, more specifically when INR (Interference to Noise Ratio) is larger than 50 dB. When INR is less than 50 dB, the performance is only slightly lower than the prior art method. The results show the same tendency for SNR=30, 40, 50 dB. The improvement decreases as the INR decreases, due to the decreased estimation quality. For 500 Hz information signal, the SINR improvement is up to 15 dB, while for 1 kHz the SINR is up to 11 dB. This is due to the fact that the frequency changes faster for 1 kHz information signal.

As shown above, the interference reduction of embodiments presented herein performs very well when the noise level is relatively low comparing to the interference. This fits very well in the remote radio head scenario. In remote radio head deployments, the cable interface noise can be as low as −160 dBm/Hz. The transmit signal PSD can be −76 dBm/Hz. In downlink, given high cable loss of 4o dB, the SNR is as high as 44 dB. Furthermore, the cable channel has very short delay spread. It enables to use most of the CP length for estimation in downlink. The baseband transmit signal is upconverted to a proper IF frequency for transmission through the cable. Cable noise and RFI are added before the remote radio head receiver. In the remote radio head, the received signal is downconverted to baseband for RFI mitigation. Alternatively, the received signal is upconverted directly to RF for transmission. In this simulation, the air channel and air interface noise are not considered, without loss of generality. The results here reflect the SINR achieved at the RF transmit port of the remote radio head. This SINR determines the maximum SINR which can be achieved in the system all the way from DU (Digital Unit) to the UE (User Equipment).

The following simulation parameters were used: the IF carrier for the OFDM signal is set at 140 MHz with 20 MHz LTE profile, while the FM RFI is set at 141 MHz. The cable interface noise is set −160 dBm/Hz. Cable interface transmit PSD is set to −76 dBm/Hz. Cable channel impulse response of 15o meter Cat 5e cable is generated using a cable model. The channel impulse response has very short delay spread, less than 0.2 μs. Given 4.7 μs CP used in LTE, most of the samples in CP can be used in RFI estimation. In this simulation, ideal synchronization is assumed, so that the receiver discards the first samples caused by the channel delay. So only the first 5 samples of the CP on each symbol are not used for estimation in both cancellation methods. And ideal FEQ is used with perfect channel estimation without noise. Cable attenuation is about 37 dB at 141 MHz. So the received SNR=−76−37−(−160)=47 dB and if the RFI power is set −65 dBm, SIR=−76−37−(−65)=−48 dB at 141 MHz.

SINR is compared between the prior art method and methods of embodiments presented here when the RFI power is −65 dBm. Similar to the AWGN case, two methods can significantly cancel out the RFI. With the embodiments presented herein, at the FM carrier, SINR is improved from −46 dB to 8 dB, which is an improvement of 54 dB. It is 16 dB better than the prior art method. The FFT leakage is also narrower than the prior art method.

Another simulation explores SINR improvement of the embodiments presented herein compared to the prior art method for the cable channel for different interference power levels with respect to the noise. The results for cables match the AWGN channel very well. This is due to the fact that the channel spread is short and most of the symbols are used for estimation. Same as for the AWGN channel, the embodiments presented herein perform better than the prior art method when INR is larger than 50 dB.

The embodiments presented herein can generally be applied on the time domain signal typically after ADC (Analogue to Digital Converter) in a receiver. If CP is used, the channel delay spread the signal goes through before the receiver should be shorter than the CP length. Generally, it is very useful for indoor small cells where the LTE CP length is much longer than the indoor wireless channel delay spread.

For remote radio heads, the embodiments presented herein in DL can be implemented in a remote radio head with digital processing capability. The analog IF signal is digitalized and then processed in a DSP (Digital Signal Processor) or FPGA (Field Programmable Gate Array. In uplink (UL), it can be implemented in the corresponding central node. Since the cable channel is very short, the added delay spread on top of the air channel is very small. There will be sufficient unused CP for the embodiments presented herein to cancel the RFI.

Furthermore, it is also useful for G.fast (ITU-T G.9700, G.9701) in next generation DSL and G.hn in power-line home network. The analog FM signal in VHF (Very High Frequency) band can also significantly interfere the systems. For short loops in G.fast, the unused CP can be used for cancellation. For less delay spread power-line channels, there is also unused CP which can be used for cancellation.

FIG. 5 is a schematic graph illustrating a simulation of when interference is estimated in the methods illustrated in FIGS. 4A-B.

The solid line ω(t) shows the interfering signal. The crosses $\tilde{\omega}_d$ indicate instances of estimated interference signal obtained using the methods illustrated in FIGS. 4A-B. Using interpolation between the crosses, the interfering signal can be estimated with great accuracy, even when a more complex waveform is seen for the interfering signal.

In this example, the FM carrier corresponds to 1 MHz in baseband, the information signal m(t) is a 500 Hz cosine wave, SNR=50 dB, SIR=−50 dB, and the estimated $\tilde{\omega}_d$ on each symbol is mapped at the half symbol time.

Figure 6:
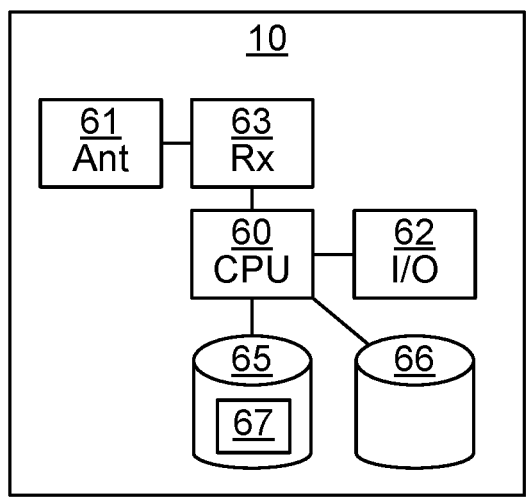
FIG. 6 is a schematic diagram showing some components of the receiver of FIG. 1.

FIG. 6 is a schematic diagram showing some components of the receiver to of FIG. 1. A processor 6o is provided using any combination of one or more of a suitable central processing unit (CPU), multiprocessor, microcontroller, digital signal processor (DSP), application specific integrated circuit etc., capable of executing software instructions 67 stored in a memory 65, which can thus be a computer program product. The processor 6o can be configured to execute the method described with reference to FIGS. 4A-B above.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The receiver to further comprises an I/O interface 62 for communicating with other external entities. Optionally, the I/O interface 62 also includes a user interface.

The receiver to also comprises one or more receiver circuitries 63 (optionally combined with transmitter circuitries in a transceiver), comprising analogue and digital components for receiving signals from the transmitter. Optionally, a suitable number of antennas 61 are provided for receiving the signals using wireless communication.

Other components of the receiver to are omitted in order not to obscure the concepts presented herein. It is to be noted that one or more of the components shown forming part of the receiver to may form part of a host device comprising the receiver and may then be shared with other functions of the host device, such as a transmitter, etc.

Figure 7:
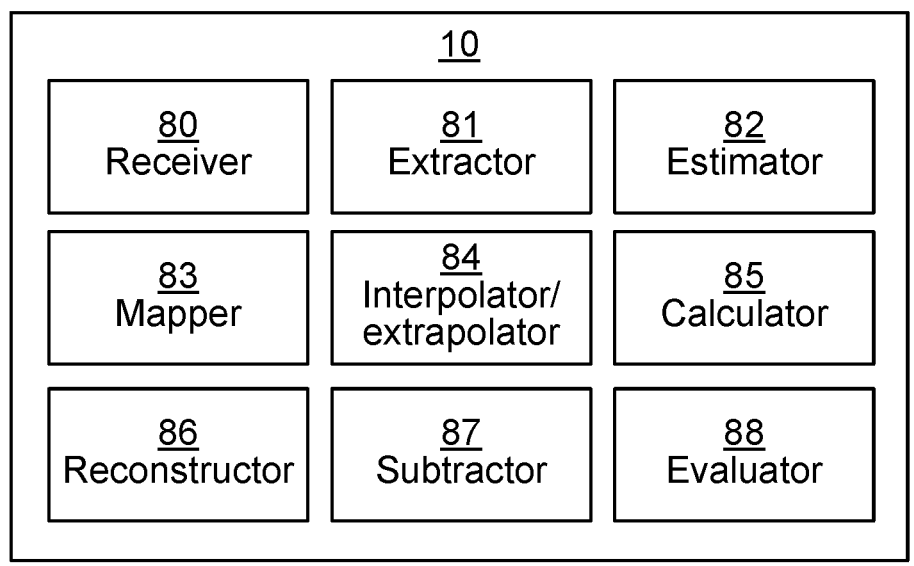
FIG. 7 is a schematic diagram showing functional modules of the receiver of FIG. 1.

FIG. 7 is a schematic diagram showing functional modules of the receiver of FIG. 1. The modules can be implemented using software instructions such as a computer program executing in the network node 1 and/or using hardware, such as application specific integrated circuits, field programmable gate arrays, discrete logical components, etc. The modules correspond to the steps in the method illustrated in FIGS. 4A-B.

A receiver 8o corresponds to steps 40 and 41. An extractor 81 corresponds to step 42. An estimator 82 corresponds to step 44. A mapper 83 corresponds to step 46. An interpolator/extrapolator 84 corresponds to step 48. A calculator 85 corresponds to steps 50 and 52. A reconstructor 86 corresponds to step 54. A subtractor 87 corresponds to step 56. An evaluator 88 corresponds to step 58.

Figure 8:
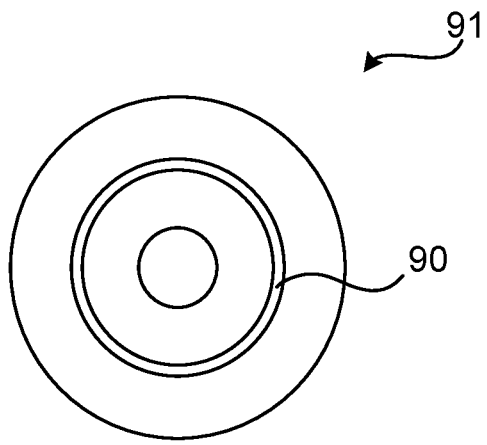
FIG. 8 shows one example of a computer program product comprising computer readable means.

FIG. 8 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 65 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for reducing interference, the method being performed in a receiver and comprising:
  receiving a first signal forming part of a symbol, wherein the first signal is based on information;

extracting a differential signal by comparing the first signal with a second signal, wherein the second signal is based on the information on which the first signal is based;

estimating a base frequency of the differential signal for the symbol;

mapping the base frequency to a first time of the symbol;

estimating frequencies at other times of the symbol using interpolation and/or extrapolation using base frequencies from at least one adjacent symbol, wherein the other times of the symbol are different than the first time of the symbol;

reconstructing an interfering signal based on the estimated frequencies; and subtracting the reconstructed interfering signal from a received signal for the symbol.

2. The method according to claim 1, further comprising:

calculating an estimated phase function by integrating the estimated frequencies; and calculating estimated amplitude and estimated phase of the differential signal based on the phase function;

wherein reconstructing the interfering signal comprises reconstructing the interfering signal based on the estimated phase function, the estimated amplitude, and the estimated phase.

3. The method according to claim 1, further comprising:

receiving the second signal, wherein the first signal is based on the information transmitted from one transmitter and the second signal is based on the information transmitted from the one transmitter.

4. The method according to claim 3, wherein the first signal carries a cyclic prefix comprising copies of information of the second signal or wherein the second signal carries a cyclic prefix comprising copies of information of the first signal.

5. The method according to claim 1, wherein the second signal is a known reference signal comprising information used by a transmitter for transmitting the first signal.

6. The method according to claim 1, wherein estimating a base frequency comprises using a least square estimate.

7. The method according to claim 1, wherein the method is performed in a digital domain.

8. The method according to claim 1, wherein estimating frequencies comprises using a sliding window function.

9. The method according to claim 1, wherein estimating frequencies comprises using a spline function.

10. The method according to claim 1, wherein the first time is in the middle of the symbol.

11. A receiver comprising:

a processor; and a memory storing instructions that, when executed by the processor, cause the receiver to:

receive a first signal forming part of a symbol, wherein the first signal is based on information;

extract a differential signal by comparing the first signal with a second signal, wherein the second signal is based on the information on which the first signal is based;

estimate a base frequency of the differential signal for the symbol;

map the base frequency to a first time of the symbol;

estimate frequencies at other times of the symbol using interpolation and/or extrapolation using base frequencies from at least one adjacent symbol, wherein the other times of the symbol are different than the first time of the symbol;

reconstruct an interfering signal based on the estimated frequencies; and subtract the reconstructed interfering signal from a received signal for the symbol.

12. The receiver according to claim 11 further comprising instructions that, when executed by the processor, cause the receiver to:

calculate an estimated phase function by integrating the estimated frequencies; and calculate estimated amplitude and estimated phase of the differential signal based on the phase function;

wherein the instructions to reconstruct the interfering signal comprise instructions that, when executed by the processor, cause the receiver to reconstruct the interfering signal based on the estimated phase function, the estimated amplitude, and the estimated phase.

13. The receiver according to claim 11 further comprising instructions that, when executed by the processor, cause the receiver to:

receive the second signal, wherein the first signal is based on the information transmitted from one transmitter and the second signal is based on the information transmitted from the one transmitter.

14. The receiver according to claim 13, wherein the first signal carries a cyclic prefix comprising copies of information of the second signal or wherein the second signal carries a cycle prefix comprising copies of information of the first signal.

15. The receiver according to claim 11, wherein the second signal is a known reference signal comprising information used by a transmitter for transmitting the first signal.

16. The receiver according to claim 11, wherein the instructions to estimate a base frequency comprise instructions that, when executed by the processor, cause the receiver to use a least square estimate.

17. The receiver according to claim 11, wherein the receiver is configured to perform the instructions for processing in a digital domain.

18. The receiver according to claim 11, wherein the instructions to estimate frequencies comprise instructions that, when executed by the processor, cause the receiver to use a sliding window function.

19. The receiver according to claim 11, wherein the instructions to estimate frequencies comprise instructions that, when executed by the processor, cause the receiver to use a spline function.

20. The receiver according to claim 11, wherein the first time is in the middle of the symbol.

21. A computer program product for reducing interference, the computer program product comprising a non-transitory computer readable medium storing computer program code which, when run on a receiver, causes the receiver to:

receive a first signal forming part of a symbol, wherein the first signal is based on information;

extract a differential signal by comparing the first signal with a second signal, wherein the second signal is based on the information on which the first signal is based;

estimate a base frequency of the differential signal for the symbol;

map the base frequency to a first time of the symbol;

estimate frequencies at other times of the symbol using interpolation and/or extrapolation using base frequencies from at least one adjacent symbol, wherein the other times of the symbol are different than the first time of the symbol;

reconstruct an interfering signal based on the estimated frequencies; and subtract the reconstructed interfering signal from a received signal for the symbol.

22. The computer program product of claim 21, wherein the first signal carries a cyclic prefix comprising copies of information of the second signal or the second signal carries a cyclic prefix comprising copies of information of the first signal.

\* \* \* \* \*